United States Patent
Ledet et al.

(10) Patent No.: US 7,455,742 B2
(45) Date of Patent: Nov. 25, 2008

(54) SLIT-COURSE PLY PLACEMENT DEVICE AND METHOD

(75) Inventors: Roger J. Ledet, Winnipeg (CA); Trevor M. McDonald, Winnipeg (CA); Arnold J. Lauder, Winnipeg (CA)

(73) Assignee: The Boeing Company, Chicago, IL (US)

( * ) Notice: Subject to any disclaimer, the term of this patent is extended or adjusted under 35 U.S.C. 154(b) by 647 days.

(21) Appl. No.: 11/058,267

(22) Filed: Feb. 16, 2005

(65) Prior Publication Data

US 2006/0180270 A1 Aug. 17, 2006

(51) Int. Cl.
*B32B 38/10* (2006.01)

(52) U.S. Cl. .......................... 156/64; 156/258; 156/259; 156/264; 156/353; 156/512

(58) Field of Classification Search ........................ 156/64, 156/258, 259, 264, 353, 512
See application file for complete search history.

(56) References Cited

U.S. PATENT DOCUMENTS

| | | | | |
|---|---|---|---|---|
| 3,775,219 | A * | 11/1973 | Karlson et al. | 156/363 |
| 3,970,831 | A * | 7/1976 | Hegyi | 318/568.1 |
| 4,591,402 | A * | 5/1986 | Evans et al. | 156/350 |
| 4,696,707 | A * | 9/1987 | Lewis et al. | 156/64 |
| 4,867,834 | A | 9/1989 | Alenskis et al. | |
| 5,141,585 | A * | 8/1992 | Shinno et al. | 156/350 |
| 5,235,907 | A * | 8/1993 | Hirata | 101/118 |
| 7,137,182 | B2 * | 11/2006 | Nelson | 29/428 |
| 7,213,629 | B2 * | 5/2007 | Ledet et al. | 156/378 |
| 2004/0226651 | A1 * | 11/2004 | Ledet et al. | 156/250 |
| 2005/0240291 | A1 * | 10/2005 | Oldani et al. | 700/57 |
| 2005/0274446 | A1 * | 12/2005 | Evans | 156/64 |
| 2006/0073309 | A1 * | 4/2006 | Hogg | 428/156 |
| 2006/0073311 | A1 * | 4/2006 | Hogg | 428/174 |
| 2006/0260751 | A1 * | 11/2006 | Lauder et al. | 156/382 |
| 2007/0017628 | A1 * | 1/2007 | Evans | 156/230 |
| 2007/0277919 | A1 * | 12/2007 | Savol et al. | 156/64 |

FOREIGN PATENT DOCUMENTS

JP 61-290038 * 12/1986

OTHER PUBLICATIONS

U.S. Appl. No. 60/615895 entitled "Method For Laying Composite Tape," filed Oct. 5, 2004.*

* cited by examiner

*Primary Examiner*—Melvin C Mayes
(74) *Attorney, Agent, or Firm*—Baker & Hostetler LLP

(57) ABSTRACT

To apply a plurality of courses on a layup form to fabricate a composite item, a first course of the plurality of courses is applied on the layup form along a first path. A second path is determined that overlaps an edge of the first course by a predetermined minimum overlap distance. The edge is sensed. A profile is cut along a second course of the plurality of courses to correspond to the sensed edge. The second course is applied on the layup form along the second path.

17 Claims, 7 Drawing Sheets

SLIT-COURSE PLY PLACEMENT DEVICE AND METHOD

FIELD OF THE INVENTION

The present invention generally relates to a ply placement device. More particularly, the present invention pertains to a device for and method of placing plies on a surface.

BACKGROUND OF THE INVENTION

Composite items are generally constructed from layers of material that are laminated together. These layers are often referred to as partial or full plies. For structures exceeding the available material width, each layer is typically made up of a series of strips or courses of material placed near or abutting edge-to-edge next to each other or overlapped to some extent. Each ply may be in the form of woven fibers in a fabric, unidirectional fiber material, metal foils, adhesive films or a variety of other conformations. Unidirectional fiber material is often termed, "tape." The fibers may be made from any of a multitude of natural and/or "man-made" materials such as fiberglass, graphite, Kevlar®, and the like.

The courses are generally laid upon the form or tool along a "natural path" of the course material. The term "natural path" refers to the path the course material would follow when rolled out on to the surface of the tool. Deviations from the natural path are generally achieved by applying force across the width of the course material. Tape is typically more rigid than fabric and tends to resist this force to a greater extent. When the force applied exceeds the flexing capacity of the material, wrinkles or bridges form in the course material. In addition, the wider the course is, the more prone the course material is to wrinkle.

Tape courses are typically applied edge to edge. To reduce internal voids, it is generally advantageous to reduce the gap distance or tolerance between the tape courses. For example, in certain relatively high technology industries such as the aerospace industry, the gap distance may be held to 0.10" or less. For flat or cylindrical composite items, the natural path of each course is in alignment with adjacent courses. However, for contoured items, the natural path of adjacent courses may tend to cause the courses to converge or diverge. To prevent these deviations from causing the courses to overlap or diverge in excess of the tolerance, conventional automated tape lamination machines ("ATLM") generally utilize a relatively greater number of a relatively narrower course material. Unfortunately, utilizing narrower course material reduces lay-down rates.

Accordingly, it is desirable to provide a method and apparatus capable of overcoming the disadvantages described herein at least to some extent.

SUMMARY OF THE INVENTION

The foregoing needs are met, to a great extent, by the present invention, wherein in one respect an apparatus and method is provided that in some embodiments accurately place plies on a substrate.

An embodiment of the present invention relates to a method of applying a plurality of courses on a layup form to fabricate a composite item. In this method, a first course of the plurality of courses is applied on the layup form along a first path. A second path is determined that overlaps an edge of the first course by a predetermined minimum overlap distance. The edge is sensed. A profile is cut along a second course of the plurality of courses to correspond to the sensed edge. The second course is applied on the layup form along the second path.

Another embodiment of the present invention pertains to a device to fabricate a composite item. The device includes an end effector, a positioning device, a sensor, and a cutting system. The end effector applies a course to a layup form. The positioning device positions the end effector. The sensor senses an edge of a previously applied course. The cutting system cuts a profile on the course in response to the sensed edge.

Yet another embodiment of the present invention pertains to an apparatus for applying a plurality of courses on a layup form to fabricate a composite item. The apparatus includes a means for applying a first course of the plurality of courses on the layup form along a first path, a means for determining a second path that overlaps an edge of the first course by a predetermined minimum overlap distance, and a means for sensing the edge. In addition, the apparatus includes a means for cutting a profile along a second course of the plurality of courses to correspond to the sensed edge and a means for applying the second course on the layup form along the second path.

Yet another embodiment of the present invention relates to a computer readable medium on which is embedded computer software comprising a set of instructions for executing a method of applying a plurality of courses on a layup form to fabricate a composite item. In this method, a first course of the plurality of courses is applied on the layup form along a first path. A second path is determined that overlaps an edge of the first course by a predetermined minimum overlap distance. The edge is sensed. A profile is cut along a second course of the plurality of courses to correspond to the sensed edge. The second course is applied on the layup form along the second path.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION OF THE PREFERRED EMBODIMENT

Figure 1:
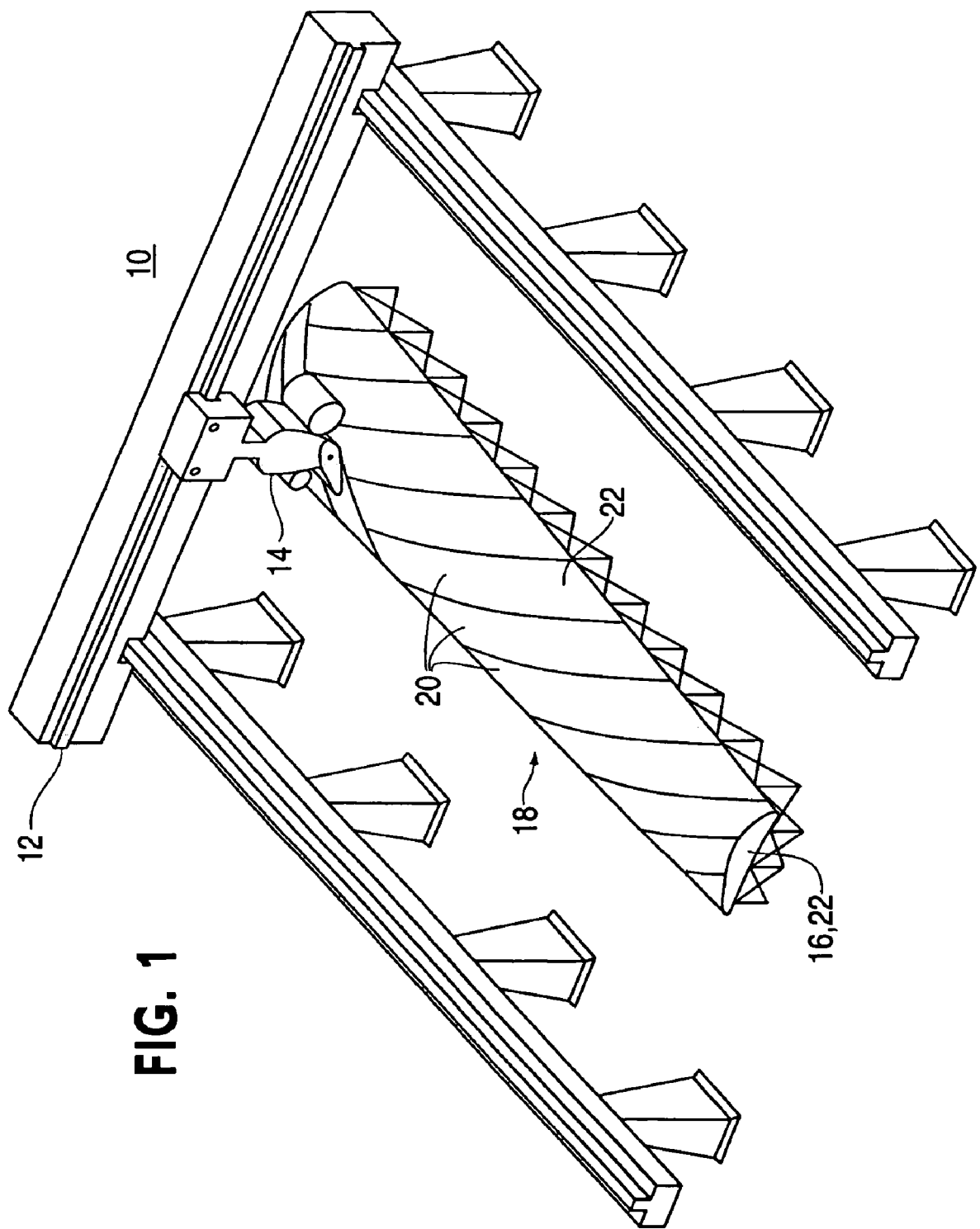
FIG. 1 is a perspective view of an automated tape lamination machine according to an embodiment of the invention.

The invention will now be described with reference to the drawing figures, in which like reference numerals refer to like parts throughout. As shown in FIG. 1, a slit course ply placement device 10 ("SCPPD") suitable for use in an embodiment of the invention includes a positioning device 12 and an end effector 14 configured to apply course material on a form 16. The positioning device 12 is configured to position or otherwise control the movement of the end effector 14 and/or the form 16. In an embodiment of the invention, the positioning device 12 is a gantry-type positioning device configured to control ten axes of movement (five axes of the gantry and five axes of the end effector 14). However, it is to be understood that the specific number of axes may depend upon the particular operating condition and thus, the number of axes controlled is not critical to the invention. In various other embodiments, the positioning device 12 includes a robotic armature and/or a vehicle. With regard to a vehicular positioning device, such device is described in U.S. patent application Ser. No. 10/986,292, entitled, OPTICAL LASER GUIDANCE SYSTEM APPARATUS AND METHOD, filed on Nov. 12, 2004, having inventors Roger J. LEDET and John E. YESTRAU, the disclosure of which is hereby incorporated in its entirety. In yet other embodiments, the positioning device 12 is configured to control the movements of the tool 16. For example, the tool 16 includes a rotating mandrel or X-Y table.

The end effector 14 is configured to apply course material on the form 16. In various forms, the end effector 14 includes a compaction roller, sweep, and/or vacuum placement shoe to apply the course material to the form 16. With regard to the vacuum placement shoe, such device is described in U.S. patent application Ser. No. 10/437,067, entitled Vacuum Assisted Ply Placement Shoe and Method, filed on May 14, 2003, having inventors Roger J. Ledet, Arnold J. Lauder, and Matthew J. Shewfelt, the disclosure of which is hereby incorporated in its entirety. The form 16 is configured to provide a suitably stable and finished surface for ply placement. Characteristics of the form 16, such as size, shape, contour, and the like, are based upon design parameters of an item 18. The item 18 is shown in FIG. 1 being constructed from a plurality of courses 20. Each layer of courses 20 placed upon the form 16 or a substrate 22 is described as a ply and the item 18 is typically fabricated from a plurality of plies. The substrate 22 includes the form 16 surface and/or a previously applied course 20.

Figure 2:
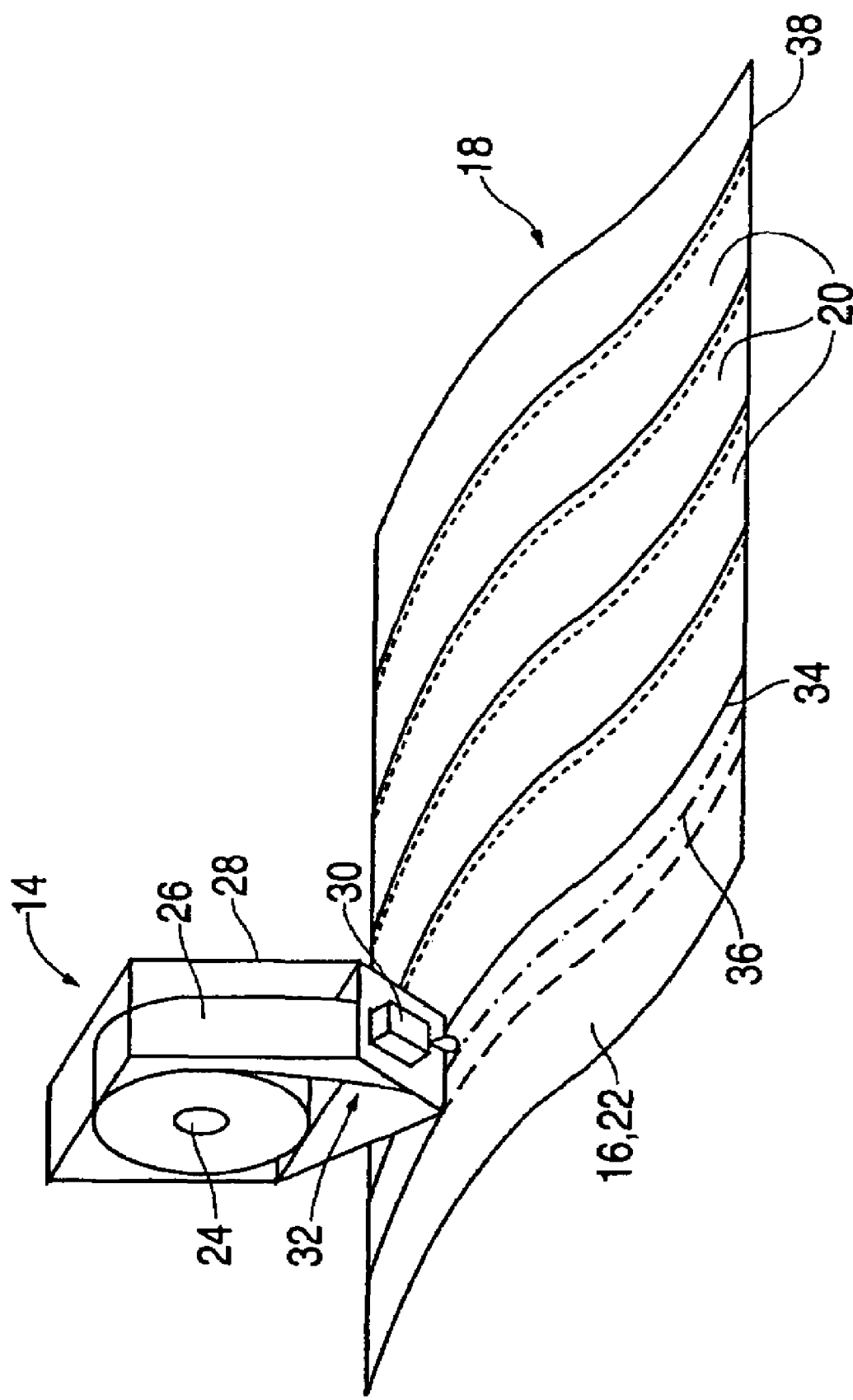
FIG. 2 is a perspective view of a front of an end effector suitable for use with the automated tape lamination machine of FIG. 1.

FIG. 2 is a perspective view of a front of the end effector 14 that is suitable for use with the SCPPD 10. As shown in FIG. 2, the end effector 14 includes a supply roll 24 to dispense a course material 26, housing 28, and sensor 30. The course material 26 includes any suitable course material. Examples of suitable course material include various fibers, films, foils, and/or the like. Particular examples of fibers include glass, aramid, carbon, and various other fibers in the form of unidirectional "tape," woven fabric, biaxial cloth and the like. In addition, the course material 26 may be pre-impregnated with a resin or other such binding substance. The course material 26 optionally includes a backing or separator film 32 (Shown in FIG. 4) to substantially prevent the course material 26 from adhering to itself while in roll form.

The sensor 30 includes any suitable sensing device. Examples of suitable sensing devices include tactile, optical, and systems employing various forms of electromagnetic radiation such as infra red (IR), microwave, and the like. In a particular example and as discussed further herein, the sensor 30 includes a machine vision system configured to determine the position of an edge 34 of a previously applied course 20. In various other examples, the sensor 30 includes an array of feelers that contact the substrate 22 and sense a difference in height and/or an array of photo detectors that sense differences in incident light reflected from the substrate 22.

The SCPPD 10 typically applies the course material 26 upon the substrate 22 along a "natural path." Generally, the natural path is described in terms of a path the course material 26 would take when rolled out upon the substrate 22. More specifically, a centerline 36 of the natural path is described geometrically as a geodesic curve on the substrate 22. That is, the shortest distance between two points that lies on the substrate 22.

FIG. 2 additionally illustrates an interface 38 disposed between two adjoining courses 20. This interface 38 generally coincides with the warp direction of the flanking courses 20. The interface 38 may diverge somewhat from the warp direction of one or both of the flanking courses 20 depending upon the taper or profile of the courses 20. The item 18 typically includes multiple plies and it is not uncommon that two or more plies may lay in the same or approximately same warp direction. Plies laying in the same warp direction are generally separated by several plies in other warp directions. Still, it is preferable that interfaces 38 of the plies laying in the same or similar warp direction are not in alignment. It is an advantage of an embodiment that the alignment of the interfaces 38 are determined and adjusted or offset if found to be in alignment.

Figure 3:
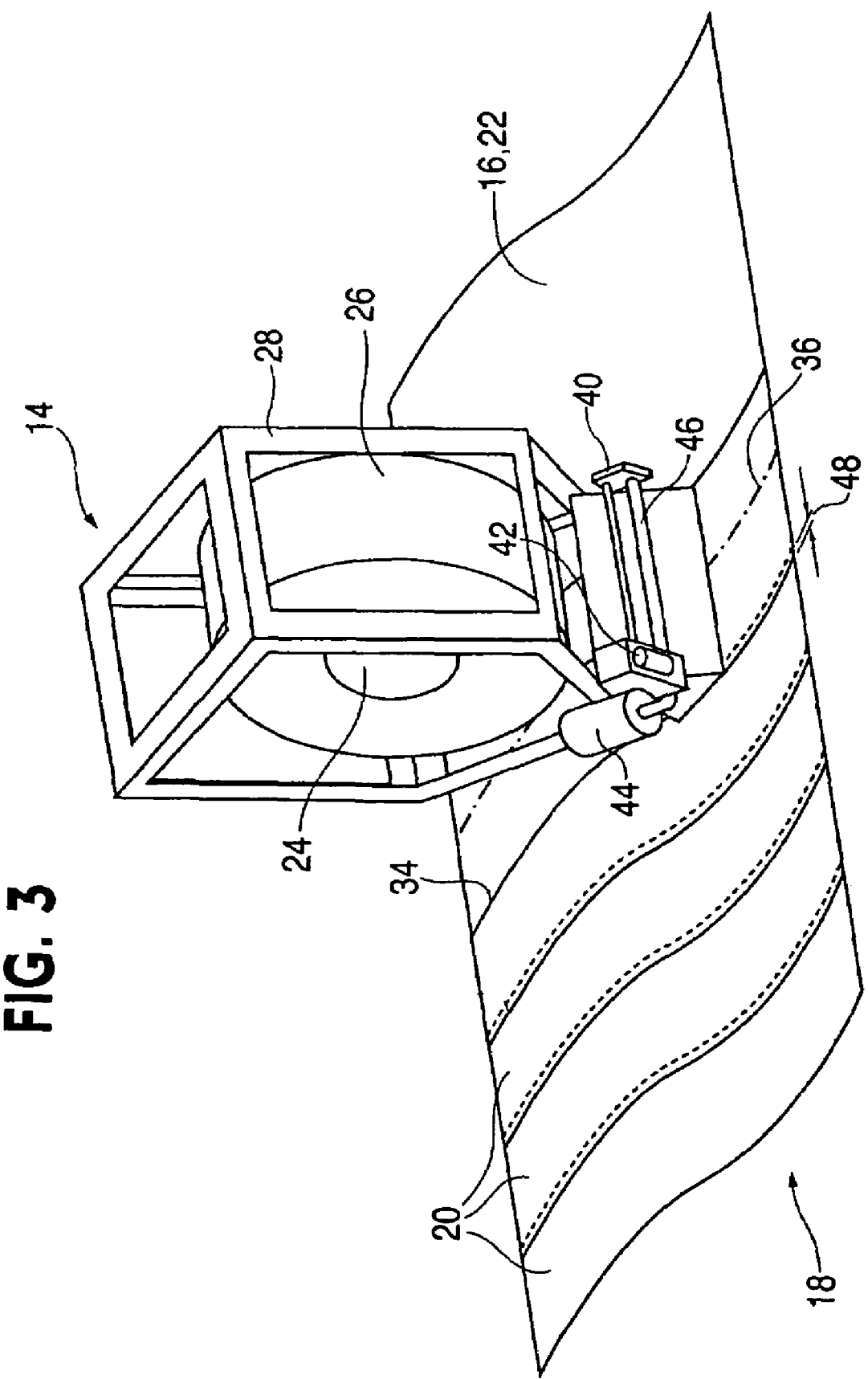
FIG. 3 is a perspective view of a rear of an end effector suitable for use with the automated tape lamination machine of FIG. 1.

FIG. 3 is a perspective view of a rear of the end effector 14 suitable for use with the SCPPD 10. As shown in FIG. 3, the end effector 14 further includes a cutting assembly 40 configured to cut the course material 26. In general, the cutting assembly 40 performs cuts to generate a side edge profile. In addition, the cutting assembly performs end cuts, such as leading edge and trailing edge cuts. The cutting assembly 40 includes any suitable cutting device 42 operable to sever or otherwise cut the course material 26. Suitable devices include ultrasonic knives, saws, lasers, and the like. Furthermore, the cutting assembly 40 includes an actuator 44 to position the cutting device 42 along a rail 46 that traverses the course material 26. The actuator 44 is configured to respond to signals from a controlling device.

In operation, the SCPPD 10 is configured to apply the courses 20 to generate a ply of the item 18. The course material 26, is typically applied according to the manufacturer's specifications. For example, courses of unidirectional tape are typically abutted and/or applied within a gap tolerance of about 0.10 inches with essentially no overlap tolerance. In another example, fabric typically has no gap tolerance, but rather, may have an overlap tolerance of 0.25 to 0.50 inches. Depending upon the contour of the substrate 22, the natural path of the courses may converge or diverge beyond these tolerances. In an embodiment, the paths of the courses 20 are defined such that an overlap 48 is generated. The overlap 48 is configured such that at a relative maximum divergence between two abutting courses 20, the respective edges of the abutting courses 20 are not further away than the gap tolerance. In the event that the overlap 48 exceeds the overlap tolerance, excess course material 26 is trimmed. The amount of excess to trim is determined based upon the sensed edge of the previously applied course 20. For example, when applying unidirectional tape, the cutting assembly 40 is controlled to cut a profile along the edge of the course material 26 to essentially coincide with the edge of the previously applied course 20.

Figure 4:
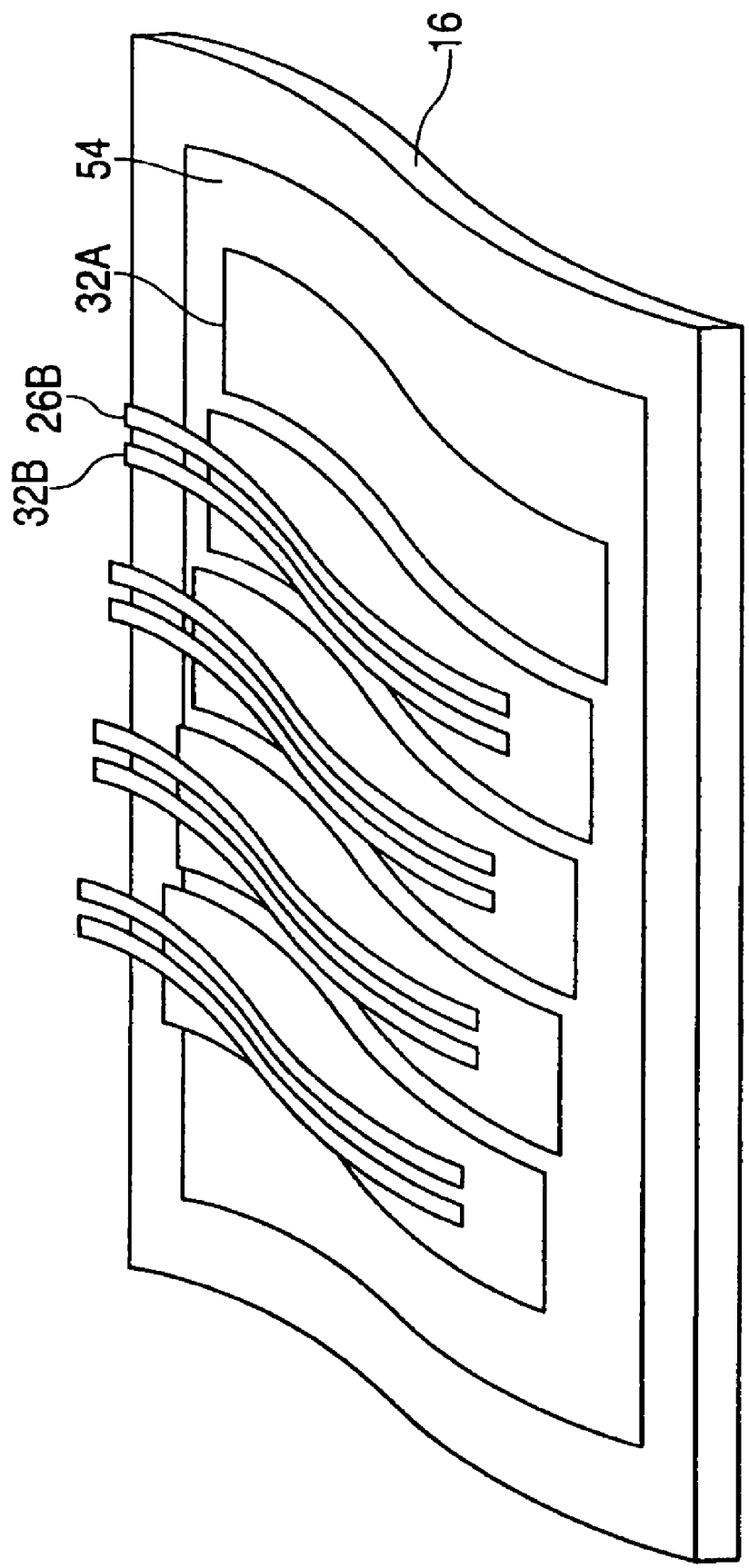
FIG. 4 is an exploded view of a ply layup according to an embodiment of the invention.

FIG. 4 is an exploded view of a ply layup according to an embodiment of the invention. As shown in FIG. 4, a ply 54 is consolidated upon the form 16. That is, the courses 20 are applied to the form 16 and together these courses generate the ply 54. In the example illustrated in FIG. 4, the separator film 32 is shown severed into strips 32A and 32B with the strip 32A covering the portion of the course material 26 utilized to generate the ply 54 and the strip 32B covering a trimmed excess course material 26B. In another embodiment, the separator film is essentially left intact during edge cutting operations. For example, the cutting assembly 40 is disposed upon the course material 26 side rather than the separator film 32 side and the cutting assembly 40 is configured to substantially leave the separator film 32 uncut as the course material 26 is cut.

According to an embodiment, the separator film 32 is removed following fabrication of the ply 54. It is an advantage of this embodiment that the separator film 32 substantially prevents the excess course material 26B from adhering to the previously applied course 20. As shown in FIG. 4, the separator film 32A substantially prevents the excess course material 26B from adhering to the previously applied course 20. In addition, the separator film 32A facilitates protection of the ply 54 from dust, debris, and physical insult such as, for example, scratches, abrasion, and the like. In various embodiments, the separator film 32 is removed prior to or during application of successive courses of the course material 26 to the substrate 22, as is the case when edges of successive courses of the course material 26 are overlapped. In such instances, a take up reel, for example, is configured to accumulate the separator film 32, 32A and/or 32B, and/or the excess course material 26B. A suitable take up reel for use with the SCPPD 10 is described in U.S. patent application Ser. No. 10/975,433, entitled, AUTOMATED FABRIC LAYUP SYSTEM AND METHOD, filed on Oct. 29, 2004, having inventors W. Robert Nelson, Michael C. Dowling, Mark K. Stephen, Raymond L. Royal, and C. Tim Harbaugh, the disclosure of which is hereby incorporated in its entirety.

Figure 5:
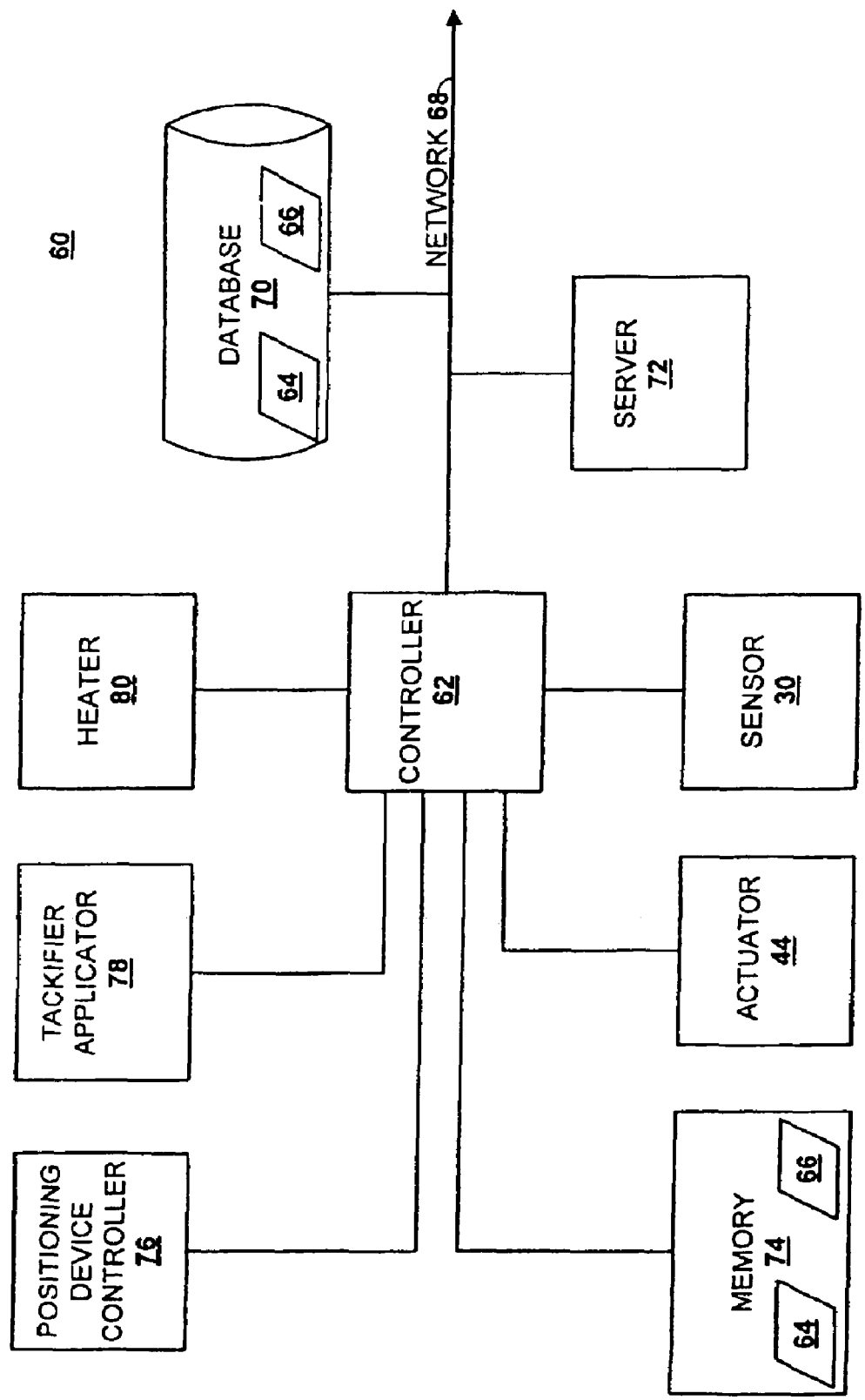
FIG. 5 is a block diagram of a system architecture for an automated tape lamination system in accordance with an embodiment of the invention.

FIG. 5 is a block diagram of a system 60 suitable for use with the SCPPD 10. As shown in FIG. 5, the system 60 includes a controller 62. The controller 62 is operable to execute computer readable code. In this regard, the system 60 includes a set of computer readable instructions or code 64. According to the code 64, the controller 62 is configured to access a file 66. This file 66 includes one or more of the following: a computer readable model of the composite item; a computer readable representation of the surface of the layup form or the form 16; a computer readable representation of the edges of the form 16; the thickness of the composite item; a source code based upon at least one of the composite item and the form 16; a set of movement instructions based upon the source code; data gathered while laying up the composite item; timestamp information; positional information; identification numbers; and the like. The controller 62 is further configured to communicate across a network 68. The network 68 is optionally included to provide additional data storage and/or processing capabilities. In this regard, the network includes a database 70 and a server 72. The database 70 is configured to store a copy of the code 64 and/or file 66. The server 72 is configured to generate, store, and perform any suitable processing of the code 64 and/or file 66. In this manner, composite items generated on computer aided design (CAD) machines such as the server 72, for example, may be forwarded to the SCPPD 10. In addition, the server 72 is operable, via the network 68, to forward updates for the code 64 and/or file 66. In addition, the system 60 optionally includes a memory 74. If present, the memory 74 is configured to store a copy of the code 64 and/or file 66.

Also shown in FIG. 5 is a positioning device controller 76. The positioning device controller 76 is optionally included in the system 60 depending upon the requirements of the various actuators and/or servo motors of the SCPPD 10. That is, depending upon the particular configuration of the SCPPD 10, a plurality of actuators and/or servo motors modulate the rotation, position, speed, direction, and the like of the various components of the SCPPD 10. More particularly, these actuators and/or servo motors of the positioning device are at least configured to modulate the various axes of the end effector 14 and/or SCPPD 10. If present, parameters of the positioning device controller 76 are based upon the specification of the various actuators, servos, and/or the controller 62. The positioning device controller 76, if present, is configured to control some or all of these actuators and/or servo motors. In addition, these actuators and/or servo motors are optionally operable to be modulated by the controller 62 directly, and thus, the system 60 may not include the positioning device controller 76.

In addition, the controller 62 is configured to receive signals from the sensor 30 and, in response to these signals, determine the position of the edge of a previously applied course 20. For example, employing an optical sensor, image signals are received from the sensor 30 and the controller 62, utilizing image analysis algorithms, identifies differences between the edge of the previously applied course 20 and the underlying substrate 22. In a particular example, the separator film 32 is a white or light color and the course material 26 and form 16 are black or a relatively darker color. Thus, by identifying an interface between the white and black regions, the position of the edge is determined. In another example, the course material 26 is a relatively light color and the separator film 32 is a relatively darker color. Similarly, other differentiating optical characteristics may be employed to determine the edge. In another example, the sensor 30 includes feelers that contact the substrate and signals from the sensor 30 are utilized to determine a height difference between the previously applied course 20 and the underlying substrate 22.

The controller 62 is further configured to modulate any suitable actuator such as, for example, servo motor, rack and pinions, linear drive belts, linear slides, X-Y tables, pneumatic rams, linear actuators, and the like. In particular, the controller 62 is configured to control the action of the actuator 44 in response to the sensed edge of the previously applied course 20. In this manner, a profile is cut upon an edge of the course material 26, by the cutting assembly which substantially conforms to the sensed edge.

The system 60, optionally, further includes a plurality of sensors configured to sense the various suitable operating conditions or attributes of the SCPPD 10. Examples of suitable attributes include some or all of the temperature of the course material 26, the temperature at the location where the separator film 22 is separated from the course material 26 (release point), feed rate and direction, material placement, backing integrity, supply of course material 26, and/or the like.

To apply a tackifier to the form 16, the system 60 optionally includes a tackifier applicator 78. The tackifier facilitates first ply adhesion to the form 16. More particularly, tackifier resins modify the rheological properties of an adhesive system. These tackifiers are combined with base polymers/elastomers in adhesives to improve the tack or ability to stick. In general this property is achieved by an increased wetting out onto a surface and improved specific adhesion. More specifically, by modulating the tackifier and base resin combination, the viscoelastic behavior of the adhesive is varied. In addition, the particular tackifier utilized is typically dependent upon its suitability or compatibility with the base resin. For example, suitable tackifiers for use with a bismaleimide (BMI) resin base may include: Toray E-09 manufactured by Toray Composites (America) of Tacoma, Wash.; MSR 355-HSC manufactured by The Boeing Company of Chicago, Ill.; and the like. The invention is not limited to the use of BMI resin and its compatible tackifiers, but rather, any suitable resin and base/tackifier resin system is within the scope of embodiments of the invention. However, tackifier may tend to foul any surfaces of the end effector 14 that comes in contact with the tackifier. As the width of the course material 26 is modulated by the cutting assembly 40, so to is the width of the tackifier application modulated. In this regard, the tackifier applicator 78 applies the tackifier in a controllable manner. In an embodiment, the tackifier applicator 78 is modulated by the controller 62 to apply the tackifier to the form 16 in an area where the course material 26 is to be placed substantially without overlap into adjacent areas. For example, the tackifier applicator 78 includes an array of independently controllable spray nozzles that essentially span the width of the course material 26. In another example, the tackifier applicator 78 includes a spray nozzle that is controllable to sweep to and fro and thereby span the width of the course material 26 or some portion thereof.

To evaporate the tackifier ("flash off"), modulate the temperature of the form 16, the course material 26 and/or the separator film 22, the system 60 optionally includes a heater 80. The heater 80 includes any suitable heating device such as, for example an electrical heating element and blower, infrared device, induction heater, and/or the like. In a particular example, the heater 80 includes a heating element and a blower configured to direct a stream of heated air as appropriate. For example, the stream of heated- air may be directed aft of the tackifier applicator 78 and forward of a ply placement shoe module of the end effector 14. In addition, the heater 80 optionally includes a nib heater, chute heater, and release point blower. If present, these devices are modulated by the controller 62. The nib heater applies a controlled amount of heat to the form 16, the course material 26 and/or the separator film 22 in response to controlling signals generated by the controller 62. Similarly, the chute heater applies a controlled amount of heat to the course material 26 and/or the separator film 22 in response to controlling signals generated by the controller 62. In addition, the release point blower directs a flow of air toward the release point in response to controlling signals generated by the controller 62.

Figure 6:
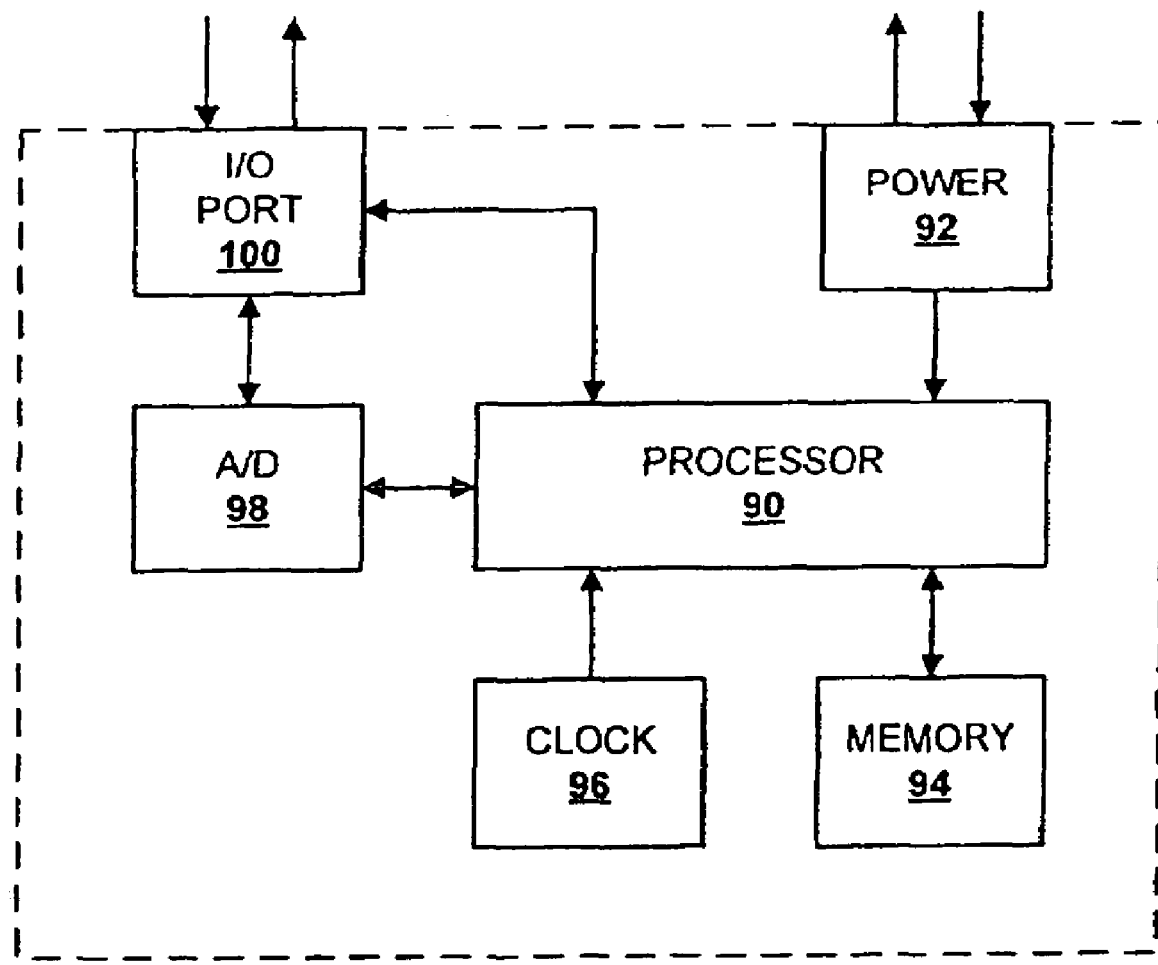
FIG. 6 is a block diagram of a system architecture for a controller suitable for use in the system according to FIG. 5.

FIG. 6 is a system architecture for the controller 62 suitable for use in the system 60. As shown in FIG. 6, the controller 62 includes a processor 90. This processor 90 is operably connected to a power supply 92, memory 94, clock 96, analog to digital converter (A/D) 98, and an input/output (I/O) port 100. The I/O port 100 is configured to receive signals from any suitably attached electronic device and forward these signals to the A/D 98 and/or the processor 90. If the signals are in analog format, the signals may proceed via the A/D 98. In this regard, the A/D 98 is configured to receive analog format signals and convert these signals into corresponding digital format signals. Conversely, the A/D 98 is configured to receive digital format signals from the processor 90, convert these signals to analog format, and forward the analog signals to the I/O port 100. In this manner, electronic devices configured to receive analog signals may intercommunicate with the processor 90.

The processor 90 is configured to receive and transmit signals to and from the A/D 98 and/or the I/O port 100. The processor 90 is further configured to receive time signals from the clock 96. In addition, the processor 90 is configured to store and retrieve electronic data to and from the memory 94. Furthermore, the processor 90 is configured to determine signals operable to modulate the positioning device controller 76 and thereby control the various actuators and/or servo motors of the SCPPD 10 to exert a particular force and/or rotate to a particular degree.

According to an embodiment of the invention, the processor 90 is configured to execute the code 64. Based on this set of instructions and signals from the various components of the SCPPD 10, the processor 90 is configured to: determine a set of movement instructions; modulate the heater 80, tackifier applicator 78, cutting assembly 40, and the like.

Figure 7:
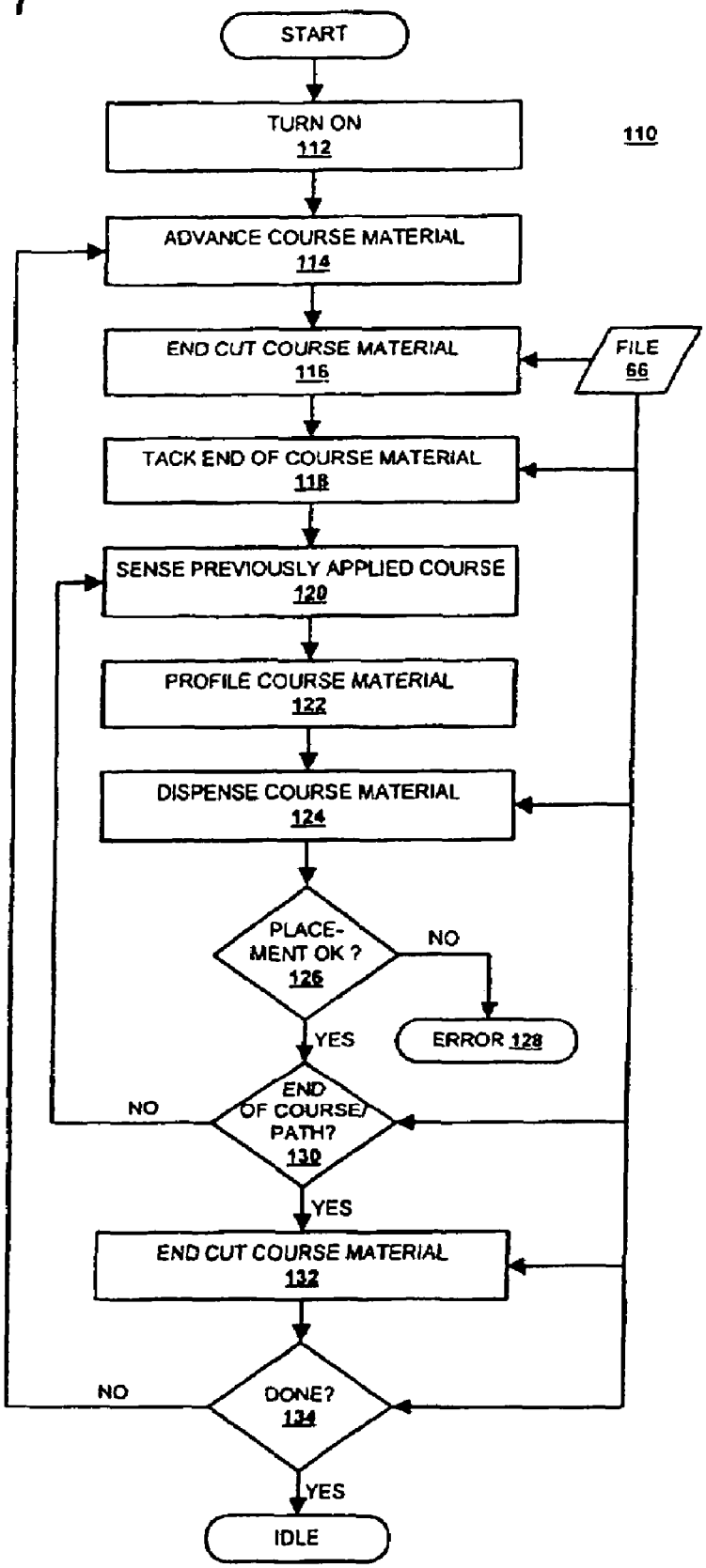
FIG. 7 is a flow diagram illustrating steps of a method in accordance with an embodiment of the invention.

FIG. 7 illustrates steps involved in a method 110 of placing plies to produce a composite structure or product. Prior to the initiation of the method 110, a composite product is designed and, based on this design, a series of computer readable instructions specifying attributes of the composite product, such as the item 18, is generated. In addition, a maximum width of material is determined based upon contours of the item 18. For example, the contour along the course paths are determined and if a contour exceeds a recommended contour for a particular width of course material, a narrower or otherwise more accommodating material is selected and the course paths are re-calculated as appropriate.

Furthermore, the interfaces 38 between plies 54 laid in a similar warp direction are determined. If two or more of the interfaces 38 approximately overlap, course paths of at least one of the plies are adjusted or offset and the course paths are re-calculated as appropriate. The computer readable instructions are utilized to control the operations of the SCPPD 10. In addition, a form or tool such as the form 16 is designed and constructed based upon the design of the composite product. Furthermore, the supply roll 24 is installed in the end effector 14 and the course material 26 is threaded through the end effector 14.

At step 112, the method 110 is initiated by turning on the various components of the SCPPD 10 described herein above and executing the computer readable instructions.

At step 114, the course material 26 is modulated by the action of the positioning device 12 and/or the supply roll 24. For example, in response to the end of the course material 26 differing from the edge of the form 16, the course material 26 is in position to be cut by the cutting assembly 40. It is to be noted that in an embodiment, the course material 26 is essentially always cut along one or both edges (profiles) and that the step 114 is optionally performed to position the course material 26 for a leading edge cut. It is an advantage of this embodiment that a substantially continuous band of edge material is maintained throughout placement of the course material 26 to facilitate removal of the excess course material 26B from the form 16.

At step 116, instructions from the file 66 are utilized for cutting an appropriate leading edge and/or profile for the course material 26 at the start of a course. In response to the instructions, the cutting assembly 40 cut the leading edge and/or profile. In addition, profile and diagonal cuts are performed in conjunction with movement of the end effector 14 relative to the form 16. In this regard, cutting operations and movement of the positioning device 12 are generally performed concurrently. In addition, while the course material 26 is being advanced, edge profile cuts based on the file 66 are performed on the course material 26 by the cutting assembly 40. In another embodiment, an edge of a previously applied course 20 is sensed in a manner similar to step 120 and the profile of the course material 26 is cut in a manner similar to step 122 prior to and/or during the step 116.

In addition, prior to and/or during the step 116, if tackifier is to be applied to the form 16, the tackifier applicator 78 is controlled to do so and the heater 80 is optionally controlled to flash off at least a portion of a solvent in the tackifier. As described herein, the tackifier is applied in a controlled manner according to instructions in the file 66. In this manner, there is essentially no excess tackifier applied that might otherwise negatively impact the performance of the end effector 14.

At step 118, the course material 26 is "tacked" to a substrate. The substrate includes, at least, the form 16 and/or a previously applied course 20. For example, the positioning device 12 is controlled to move the end effector 14 to a starting position for the course 20 and into a suitable orientation. A downward force is applied to the course material 26, pressing the course material 26 down upon the form 16 with sufficient force to cause adhesion. In addition, the location on the form 16 is determined based upon the series of computer readable instruction and/or the location of a previously positioned course material 26. As described herein, the path of a course 20 placed adjacent to a previously applied course 20 is offset to generate the overlap 48 on the previously applied course 20. This overlap 48 or a portion thereof is cut away during profiling of the edge of the course material 26 at step 122.

At step 120, a previously applied course 20, if present, is sensed. That is, when applying a second course 20, the edge of the first course is sensed. More particularly, the edge of the first course 20 at the interface between the first course 20 and the path of the second course 20 is sensed. In a similar manner, subsequent courses 20 are sensed.

At step 122, the profile of the course material 26 is generated in response to the edge sensed at step 120. For example, in response to signals from the sensor 30, the controller 92 determines a profile that corresponds to the sensed edge. The controller 92 further generates signals to modulate the cutting assembly 40 according to the determined profile. These signals are forwarded to the actuator 44. In this manner, a profile is generated upon the course material 26 that substantially corresponds to the previously applied course 20. Depending upon the course material 26, this profile is generated such that it overlaps, abuts, or approaches the edge of the previously applied course 20.

At step 124, the course material 26 is dispensed along a path across the form 16. As described herein, in order to minimize deformations in the course material 26 (e.g., wrinkles), this path is typically calculated to coincide with a "natural path" based upon any contours in the form 16. As the end effector 14 is controlled along the path across the form 16, the course material 26 is withdrawn or "free wheeled" from the supply roll 24 via the movement of the end effector relative to the substrate 22. That is, the tacked portion of the course material 26 acts to pull course material 26 from the supply roll 24. In other embodiments, the course material 26 is advanced via the action of the supply roll 24, any suitable feed assembly, take-up roll, and the like. As the course material 26 is dispensed or applied, one or more edge profiles of the course material 26 are cut, as described at step 122, via the action of the cutting assembly 40 in response to the edge sensed at step 120.

At step 126, the placement of the course material 26 on the form 16 is optionally evaluated. For example, an operator or a sensor senses the relative position of the courses 20 and determine if the distance between these courses is within a predetermined tolerance. If the distance between these courses is not within the predetermined tolerance, an error may be generated at step 128. If the distance between these courses is within the predetermined tolerance, it is determined if the end of the path has been reached at step 130. In addition to placement of the course material 26, wrinkles, bridges, foreign objects, debris, and the like are optionally sensed for by an operator and/or sensor. If any such abnormalcy is sensed, an error is generated. In addition or alternatively, the placement of the courses 20 is optionally evaluated following the completion of the ply 54. It is an advantage of an embodiment that by leaving the separator film 32 on the course material 26 until the completion of the ply 54, the ply 54 is protected from contamination and/or physical insult that may occur during evaluation.

At step 130, it is determined if the end of the course has been reached. More specifically, it is determined if the course material 26 that is approaching the cutting assembly 40 is to be end cut. If, based on the series of computer readable instruction, it is determined the course material 26 has not advanced to the end of the course, the edge of the previously applied course is sensed at step 120. If, it is determined the course material 26 has advanced to the end of the course, the course material 26 is end cut at step 132.

At step 132, the end of the course material 26 is cut based upon the series of computer readable instruction contained in the file 66, the orientation of a previously positioned course material 26, and/or the location of a previously positioned course material 26.

At step 134, it is determined if the placement of course material 26 on the composite product has been completed. For example, if all of the computer readable instructions in the file 66 have been completed, it may be determined that the placement of plies 54 for the item 18 has been completed and the SCPPD 10 may idle until another series of computer readable instructions is initiated. If is determined the placement of course material 26 for the item 18 is not completed, an additional course material 26 placement may proceed at step 114.

Following the method 110, the composite product may be cured in any suitable manner. In the aerospace industry, thermoset resins are generally utilized to pre-impregnate ply material. These thermoset resins are typically cured at an elevated temperature and pressure for a predetermined amount of time. Times, pressures, and temperatures may be selected depending on the resin used, the size and thickness of the composite product, and the like.

Although an example of the end effector 14 is shown being controlled by the positioning device 12, it will be appreciated that other control systems can be used. In this regard, a gantry system, guided vehicle, or other such positioning devices that support and control the movement of any suitable end effector are suitable for use with end effector 14. Also, although the SCPPD 10 is useful to place plies for composite products in the airline industry it can also be used in other industries that construct composite product. These industries include, but are not limited to, automobile, marine, spacecraft, building, and consumer products.

The many features and advantages of the invention are apparent from the detailed specification, and thus, it is intended by the appended claims to cover all such features and advantages of the invention that fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A method of applying a plurality of courses on a layup form to fabricate a composite item, the method comprising:
   applying a first course of the plurality of courses on the layup form along a first path;
   determining a second path that overlaps an edge of the first course by a predetermined minimum overlap distance;
   sensing the edge;
   cutting a profile along a second course of the plurality of courses to correspond to the sensed edge; and
   applying the second course on the layup form along the second path.

2. The method according to claim 1 further comprising:
   tacking an initial section of the first course to the layup form at a first location.

3. The method according to claim 1 wherein the step of sensing the edge comprises:
   optically sensing the edge.

4. The method according to claim 1 wherein the step of sensing the edge comprises:
   tactually sensing the edge.

5. The method according to claim 1 further comprising:
   generating the layup form;
   determining a warp direction for the courses, wherein the courses include a width;
   analyzing a radius of curvature of the courses applied in the warp direction upon the layup form; and
   reducing the width of the courses in response to the radius curvature being below a predetermined minimum radius.

6. The method according to claim 1 further comprising:
   applying a first ply in a first warp direction upon the layup form, the first ply comprising a layer of the courses and a first ply interface between the courses of the first ply; and
   applying a second ply in about the first warp direction upon the first ply, the second ply comprising a layer of the courses and a second ply interface between the courses of the second ply, wherein the first ply interface and the second ply interface are offset relative to each other.

7. The method according to claim 1 further comprising:
   determining the first path, wherein a centerline of the first path coincides with a geodesic curve along the layup form from a start point to an end point and having a substantially shortest distance as measured along the geodesic curve.

8. A device to fabricate a composite item, the device comprising:
   an end effector to apply a course to a layup form;
   a positioning device to position the end effector;
   a sensor to sense an edge of a previously applied course, wherein the sensor is a feeler to tactually sense the edge; and
   a cutting system to cut a profile along the course in response to the sensed edge.

9. An apparatus for applying a plurality of courses on a layup form to fabricate a composite item, the apparatus comprising:
   means for applying a first course of the plurality of courses on the layup form along a first path;
   means for determining a second path that overlaps an edge of the first course by a predetermined minimum overlap distance;
   means for tactually sensing the edge;
   means for cutting a profile along a second course of the plurality of courses to correspond to the sensed edge; and
   wherein the means for applying the first course is further configured to apply the second course on the layup form along the second path.

10. The apparatus according to claim 9, further comprising:
    means for tacking an initial section of the first course to the layup form at a first location.

11. The apparatus according to claim 9, further comprising:
    means for optically sensing the edge.

12. The apparatus according to claim 9, further comprising:
    means for generating the layup form;
    means for determining a warp direction for the courses, wherein the courses include a width;
    means for analyzing a radius of curvature of the courses applied in the warp direction upon the layup form; and
    means for reducing the width of the courses in response to the radius curvature being below a predetermined minimum radius.

13. The apparatus according to claim 9, further comprising:
    means for applying a first ply in a first warp direction upon the layup form, the first ply comprising a layer of the courses and a first ply interface between the courses of the first ply; and
    means for applying a second ply in about the first warp direction upon the first ply, the second ply comprising a layer of the courses and a second ply interface between the courses of the second ply, wherein the first ply interface and the second ply interface are offset relative to each other.

14. The apparatus according to claim 9, further comprising:
    means for determining the first path, wherein a centerline of the first path coincides with a geodesic curve along the layup form from a start point to an end point and having a substantially shortest distance as measured along the geodesic curve.

15. A computer readable medium on which is embedded computer software comprising a set of instructions for executing a method of applying a plurality of courses on a layup form to fabricate a composite item, the method comprising:
    applying a first course of the plurality of courses on the layup form along a first path;
    determining a second path that overlaps an edge of the first course by a predetermined minimum overlap distance;
    sensing the edge;
    cutting a profile along a second course of the plurality of courses to correspond to the sensed edge; and applying the second course on the layup form along the second path.

16. The method according to claim 15, wherein the step of sensing the edge comprises:
optically sensing the edge.

17. The method according to claim 15, wherein the step of sensing the edge comprises:
tactually sensing the edge.

* * * * *